United States Patent [19]

Eaton

[11] Patent Number: 5,496,231
[45] Date of Patent: Mar. 5, 1996

[54] HYDRAULIC CONTROL FOR A MULTI-SPEED POWER TRANSMISSION

[75] Inventor: James R. Eaton, Carmel, Ind.

[73] Assignee: General Motors Corporation, Detroit, Mich.

[21] Appl. No.: 310,448

[22] Filed: Sep. 22, 1994

[51] Int. Cl.[6] .............................. F16H 61/18; F16H 61/12
[52] U.S. Cl. ........................ 477/126; 477/159; 477/906
[58] Field of Search ..................................... 477/125, 126, 477/127, 159, 906, 130, 160, 161

[56] References Cited

U.S. PATENT DOCUMENTS

| | | | |
|---|---|---|---|
| 4,283,970 | 8/1981 | Vukovich | 477/161 |
| 4,313,353 | 2/1982 | Honig | 477/127 |
| 4,981,052 | 1/1991 | Gierer | 477/126 |
| 5,086,672 | 2/1992 | Kato et al. | 477/126 |

Primary Examiner—Rodney H. Bonck
Assistant Examiner—Sherry Estremsky
Attorney, Agent, or Firm—Donald F. Scherer

[57] ABSTRACT

A hydraulic control for an automatically shifted power transmission has an electronically controlled governor pressure source which provides a speed and throttle sensitive pressure for controlling the shift points and trim boost in the transmission control. An inhibitor circuit is activated in the event of a discontinuance of the electrical control, resulting in maximum governor pressure, to permit selected vehicle operation in one forward ratio and a reverse ratio. Each ratio interchange is controlled by a respective shift valve and clutch control valve. Each clutch control valve has an integral trim control which is effective to control the pressure rise in the on-coming clutch without bypassing fluid to an exhaust. Also during a ratio interchange, an off-going clutch is controlled at a reduced pressure during a portion of the ratio interchange.

2 Claims, 3 Drawing Sheets

HYDRAULIC CONTROL FOR A MULTI-SPEED POWER TRANSMISSION

TECHNICAL FIELD

This invention relates to electro-hydraulic transmission controls, and more particularly, to such controls having an electro-hydraulic governor pressure.

Specifically, this invention relates to controls, wherein predisposition to selected gear ratios is occasioned in the event of electrical service discontinuance.

BACKGROUND OF THE INVENTION

Many multi-speed automatically shifted power transmissions utilize electro-hydraulic controls. There are instances under which the electronic controls or electronic service may be discontinued for many reasons. When this occurs, it is desirable to permit the transmission to operate in at least one forward mode and one reverse mode to permit the operator to return the vehicle to a service location where the electrical problem might be repaired.

In many of these transmissions, the electrical controls include a plurality of solenoid valves which control the shifting of the transmission. The electrical discontinuance therefore affects all of the shifting controls, such that at least one hydraulic path must be provided for the desired forward ratio and reverse ratio.

SUMMARY OF THE INVENTION

The present invention utilizes a more conventional shift control valving, wherein each ratio interchange is controlled by a shift valve which is subject to a governor pressure. The shift valves are cascaded, that is, the subsequent higher ratios are not applied with high pressure fluid prior to the lower ratio being completed. Therefore, in most instances, the vehicle will begin its operation in the low or first forward ratio and be automatically shifted depending upon the operating conditions up through the highest ratio, which with the present invention, in the preferred embodiment, is a fifth speed forward ratio. The control also provides for a reverse ratio.

The control is preferably used in a countershaft type automatically shifted transmission, such that a shift fork control is operable to provide the forward-reverse selection within one of the gear paths. The present invention utilizes the third ratio clutch for both forward and reverse operation.

The shift valves are controlled by a governor pressure which is speed and throttle sensitive and is generated in a step function by a pair of governor valves and a pair of solenoid operated control valves. The solenoid valves are operated such that one valve will provide the governor pressure as a step function and the other solenoid valve provides a substantially identical pressure, but at a time lag relative to the first pressure. A step function governor which will permit this operation is shown in co-pending application U.S. Ser. No. 08/073,238, filed on Jun. 7, 1993, in the name of Long, and assigned to the assignee of the present invention.

The governor pressure is distributed to the shift valves, such that shifting sequence is accomplished by increased governor pressure. Should the solenoid valves be disconnected or otherwise not receive the electrical signal required to operated them, the governor pressure will be presented at a maximum level to the shift control valves. If this electrical discontinuance occurs when the transmission is either in the fourth or fifth speed ratio, the fifth speed ratio will be selected. However, when the vehicle comes to a halt and the operator shifts to neutral, all the clutches of the transmission are disengaged and the governor pressure, being at a maximum, is supplied through a latching circuit to force the shift valves into a third gear operating condition when the forward ratio is selected and also permits reverse operation if the reverse ratio is selected at the manual valve.

It is therefore an object of this invention to provide an improved transmission control for a multi-speed transmission having an electrically generated governor pressure source for controlling shift point operation, wherein the transmission can be selectively conditioned for a one forward speed and one reverse speed on the discontinuance of electrical service.

It is another object of this invention to provide an improved hydraulic control circuit for a multi-speed transmission, wherein a latching valve is operable to establish a control circuit for limiting the selective engagement of one forward ratio should the electrical service to the transmission control be disconnected.

It is a further object of this invention to provide an improved hydraulic control valving arrangement, wherein a latching valve is operable upon electrical service disconnection to establish a governor signal which will establish one forward ratio when selected by the manual valve or one reverse ratio when selected by the manual valve.

These and other objects and advantages of the present invention will be more apparent from the following description and drawings.

DESCRIPTION OF AN EXEMPLARY EMBODIMENT

Figures 1, 2A:
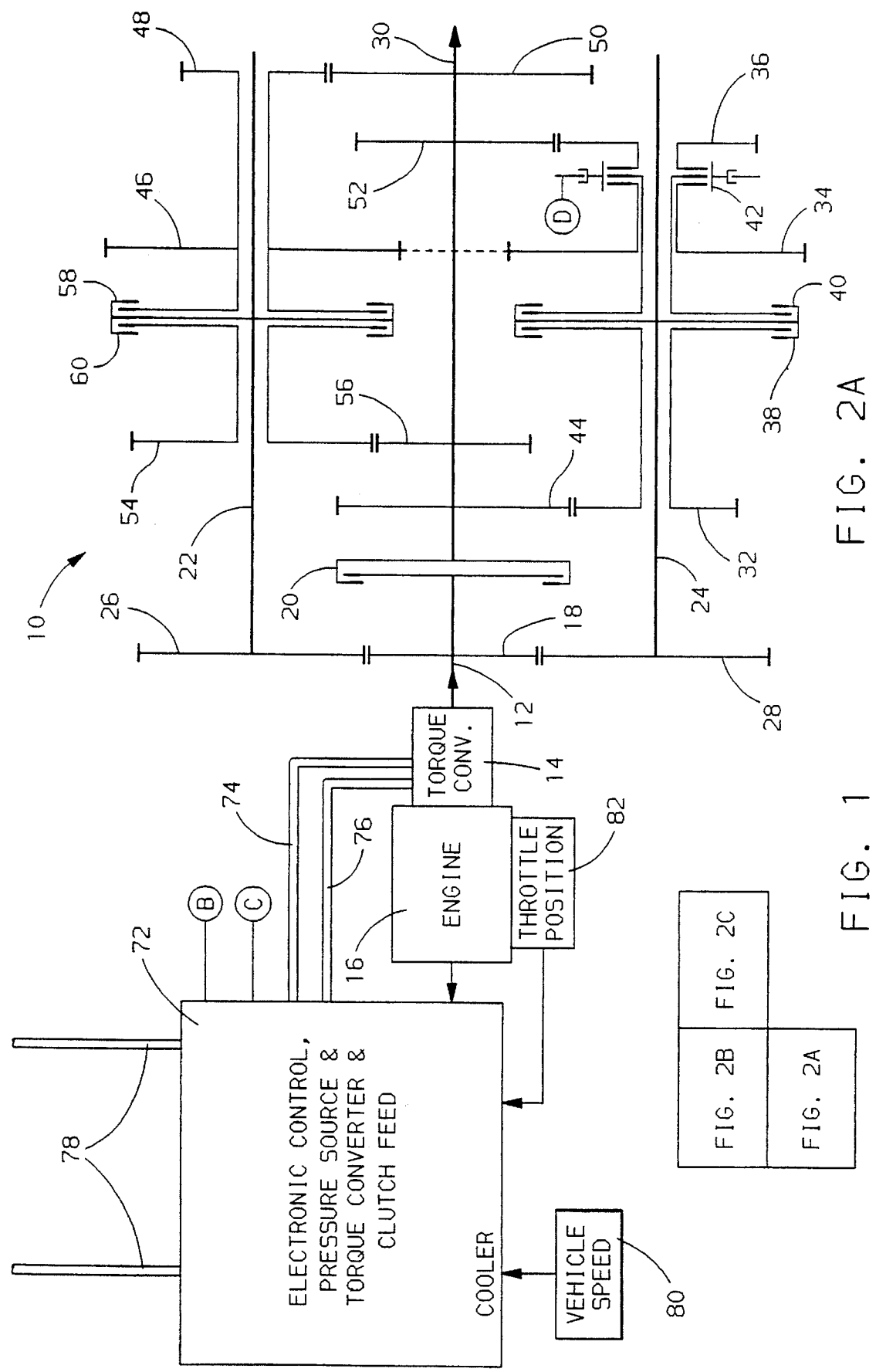
FIG. 1 is a layout showing the relationship of FIGS. 2A, 2B and 2C.
FIGS. 2A, 2B 2C and schematic representations of a power transmission and hydraulic control valving for a power transmission.

A power transmission 10 has an input shaft 12 driven by a torque converter 14 which in turn is driven by a conventional internal combustion engine 16. The input shaft 12 is drivingly connected to a gear member 18 and a clutch 20. The gear member 18 drives a pair of countershafts 22 and 24 via gear members 26 and 28, respectively. The clutch 20, when engaged, will couple the input shaft 12 directly to an output shaft 30.

The countershaft 24 has rotatably supported thereon a second ratio gear 32, a reverse ratio 34 and a third ratio gear 36. Also operatively connected with the countershaft 24 is a second ratio clutch 38 and a third ratio clutch 40. The second ratio clutch 38, when engaged, will connect the gear 32 with the shaft 24. The third ratio clutch 40, when operated, will provide a connection between a conventional synchronizer 42 and the shaft 24. The synchronizer 42 is selectively operable to connect either gear 34 or 36 to the clutch 40.

A first ratio gear 48 meshes with an output gear 50 which is drivingly connected to the output shaft 30 and will therefore provide a first or lowest ratio within the transmission when a first ratio clutch 58 is selectively engaged. The gear 34 meshes with a gear 46 which is rotatably supported on the shaft 22 and via first ratio gear 48 drives an output gear 50 which is connected with the output shaft 30. Thus, when the synchronizer 42 is selected to connect gear 34 with clutch 40 and the clutch 40 is selectively operated, a reverse ratio is provided between the input shaft 12 and the output shaft 30.

The gear 36 meshes a gear 52 which is drivingly connected with the output shaft 30, such that when the synchronizer 42 is selectively connecting the gear 36 with clutch 40 and the clutch 40 is selectively operated, a third forward ratio is provided in the transmission.

The countershaft 22 has rotatably supported thereon the gears 46 and 48, as previously mentioned, and a gear 54 which meshes with a gear 56 secured to the output shaft 30. The shaft 22 also has associated therewith the first ratio clutch 58 and a fifth ratio clutch 60. Selective engagement of the first ratio clutch 58 provides a drive connection between the shaft 22 and the gear 48, which is drivingly connected through the gear 50 with the output shaft 30. Thus, the clutch 58 will provide a first forward ratio.

The clutch 60, when engaged, will provide a connection between the shaft 22 and the gear 54 which, as previously described, meshes with gear 56 which is connected with the output shaft 30. Thus, on selected engagement of the clutch 60, a fifth ratio drive between the input shaft 12 and the output shaft 30 is provided.

The clutch 20, a previously mentioned, provides a direct drive connection between the input shaft 12 and the output shaft 30, and this is the fourth forward ratio.

The clutches 20, 38, 40, 58 and 60 are conventional fluid operated friction torque transmitting devices which construction is well known. The operation of these devices is fairly simple in that fluid is supplied to an engaging piston which enforces frictional engagement between interleaved plates which are respectively connected to housings and to the shaft to be driven. The housings may be connected either to another shaft or to gear members.

Figure 2B:
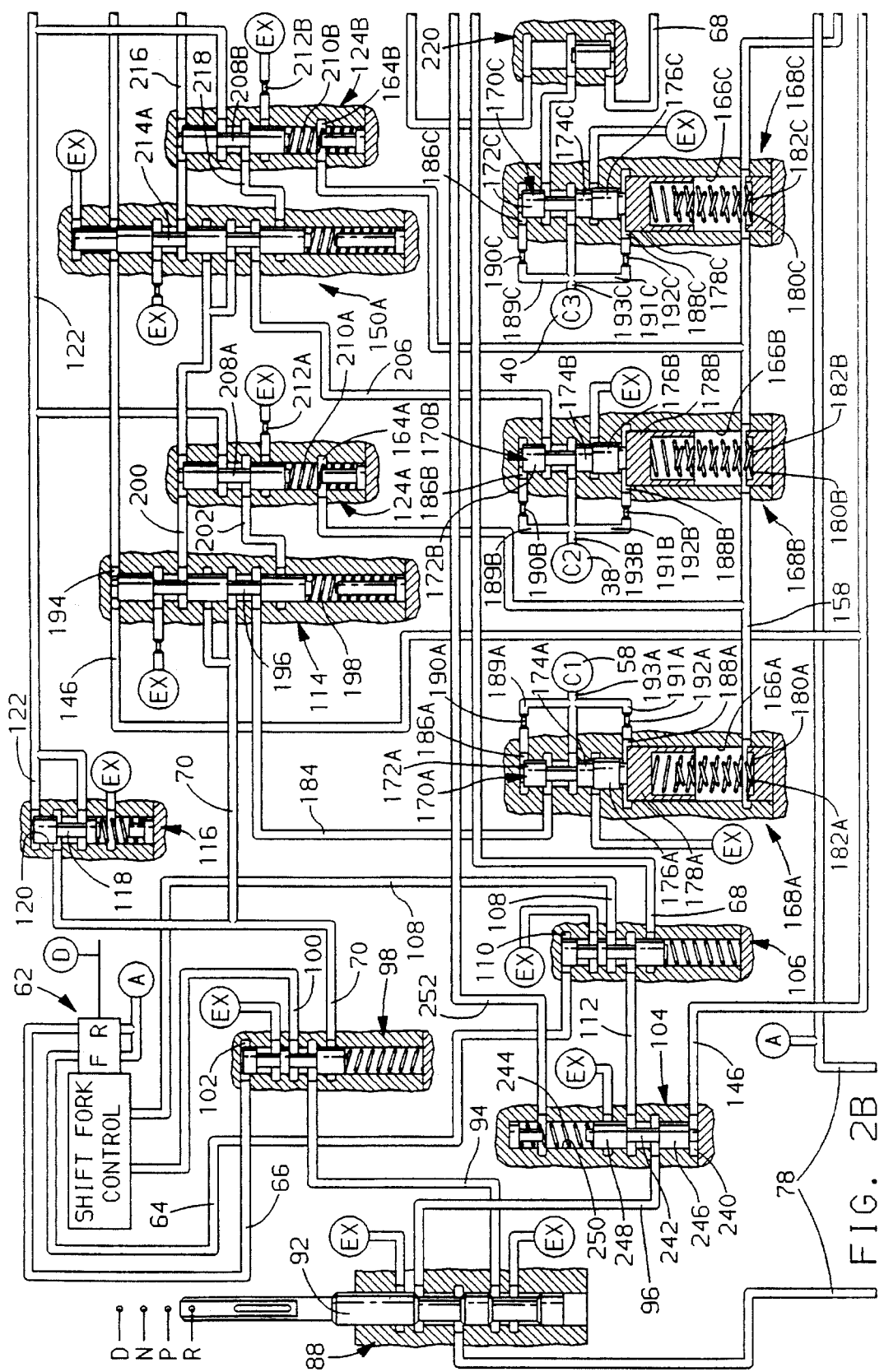

The synchronizer 42 is a conventional device which provides a mechanical drive connection between the output of the synchronizer and an input shaft. The synchronizer is controlled by shifting a sleeve axially to engage one or the other of the synchronizer hubs which is connected to respective members to be driven. The sleeve is generally controlled by a shifting fork which is, in turn, controlled by a fluid operated piston mechanism. One such mechanism is shown in U.S. Ser. No. 08/104,967, filed on Aug. 10, 1993, in the name of Raszkowski, and assigned to the assignee of the present invention. This shift fork control mechanism is generally indicated as 62 in FIG. 2B.

The shift fork control 62 has an output member D which is connected to operate the sleeve of the synchronizer 42. The operation of these hydraulically controlled shift forks is well known and the particular shift fork disclosed in the above patent application provides further features, wherein the shifting of the hydraulically controlled piston is also operable to control interlock mechanisms with valve members in the hydraulic control. These are known as passages 64 and 66 which are operable to establish reverse clutch feed in passage 68 and forward clutch feed in passage 70, respectively.

The engine 16 is operable to drive the torque converter 14, which has connected therewith a pressure source torque converter clutch feed and electronic control, generally designated 72. These are conventional electrical and hydraulic devices which are operable to provide the desired control functions within a power transmission. The pressure source, for example, may be one of the many positive displacement pumps, either an internal or external gear or vane type, which are well known. The torque converter and clutch feed and control circuits are known devices which are operable to provide selective pressurization of a torque converter apply circuit 74 or a torque converter clutch release circuit 76. The torque converter 14 is ted with hydraulic fluid no matter which of the torque converter clutch apply or torque converter clutch release circuits are pressurized.

The control 72 also includes such devices as a maximum system pressure regulator which supplies maximum system pressure to a main passage 78 and to a cooler, not shown. The control 72 receives vehicle speed signals 80 and throttle position signals 82. The control 72 is also connected to receive an engine speed signal. The control 72 provides output electrical signals B and C which are connected respectively to solenoid valves 84 and 86. These solenoid valves are preferably of the pulse width modulated type, such that a given voltage level or current level for the output of the solenoid valve is established. The signals B and C are generated in response to the vehicle speed signal 80 and throttle position signal 82, such that a combined pressure output at the solenoids 84 and 86 is established as a function of these input control signals.

The solenoids, as previously mentioned, operate the governor function which is described in U.S. Ser. No. 08/073,238, filed on Jun. 7, 1993, in the name of Long, and assigned to the assignee of the present invention.

The control 72 is operable to provide a pressure for controlling the engagement and shift points of the various clutches for the transmission 10. The transmission 10 can be built in accordance with the transmission disclosed in U.S. Pat. No. 5,009,118, issued to Ordo et al. on Apr. 23, 1991, and assigned to the assignee of the present invention. The main passage 78 is connected to a manual selector valve 88, to the solenoid valves 84 and 86, to a trim pressure control valve 90, and to the shift fork control 62. The manual valve 88 has a manually controlled spool portion 92 which is selectively movable to a plurality of positions including a forward drive position, a neutral park position and a reverse position. The valve 90 has two spool valve elements 91 and 93. A differential area exists between these valve elements 91 and 93.

In the forward drive position, the main passage 78 is connected to a forward passage 94 and in the reverse position, the manual selector valve 88 is operable to connect the main passage 78 to a reverse passage 96. The forward passage 94 is connected to a reverse-forward valve 98 which distributes fluid pressure via passage 100 to the shift fork control mechanism 62 which will then assume the forward position, such that main pressure is distributed via passage 66 to a forward hold chamber 102 on the valve 98 to urge the valve to admit fluid pressure to the forward clutch feed passage 70. At the same time, the passage 100 is exhausted and the shift fork control mechanism 62 will remain in the forward position.

If the manual selector valve 88 is moved to reverse, the passage 96 is pressurized, such that a reverse inhibit valve 104 is effective to distribute fluid to a forward-reverse valve 106 which in turn directs fluid via a reverse synchronizer passage 108 to the shift fork control mechanism 62. Fluid pressure in passage 108 will cause fork control 62 to assume the reverse position which will direct fluid pressure via passage 64 to a reverse hold chamber 110 formed on the valve 106. This will result in the valve 106 to assume its shifted position such that main pressure is distributed via a passage 112 to the reverse feed passage 68.

The forward clutch feed passage 70 is disposed in fluid communication with a 1–2 shift valve 114 and a clutch hold regulator valve 116. The clutch hold regulator valve 116 has a valve spool 118 slidably disposed in the valve bore 120 and is responsive to fluid pressure in passage 70 to provide a reduced pressure in a clutch hold passage 122. This pressure in passage 122 is referred to as a clutch hold pressure which, as will be described later, is effective to provide a reduced clutch engaging pressure to the various clutch devices in a prescribed manner.

The passage 122 is connected with a plurality of trip valves 124—124A is the first speed trip valve; 124B is the second speed trip valve; 124C is the third speed trip valve and 124D is the fourth speed trip valve.

In the detailed description which follows, and as previewed in the previous paragraph, a particular structural member, component or arrangement may be employed at more than one location. When referring generally to that type of structural member, component or arrangement, a common numerical designation shall be employed. However, when one of the structural members, components or arrangements is so identified as to be individually identified, it shall be referenced by a letter suffix employed in combination with the numerical designation. Thus, there are at least four trip valves which are generally identified by the numeral 124, but the specific individual trip valves are therefore identified as 124A, 124B, 124C and 124D in the specification and on the drawings. This same suffix combination shall be employed throughout the specification.

The solenoid valves 84 and 86 provide output pressures at passages 126 and 128, respectively, which communicate with a governor valve 130. Governor valve 130 has a spool valve 132 which is slidably disposed in a valve bore 134 to control distribution of the fluid pressure in passage 126 to a passage 136 and from the passage 128 to a passage 138. The passages 136 and 138 are connected to opposite ends of a spool valve 140 which is a member of a governor valve 142.

The spool valve 140 is slidably disposed in a valve bore 144 which is operable to control distribution of fluid pressure from passage 136 to a governor passage 146 and to control distribution of fluid pressure in passage 138 to a trim passage 148. The valve spool 140 responds to the higher of the pressures in passage 136 and 138, such that if the pressure in passage 138 is higher, the spool valve 140 will control distribution of pressure in passage 138 to passage 146, and from passage 136 to passage 148. This is one of the features which is described in U.S. Ser. No. 08/073,238, filed Jun. 7, 1993, in the name of Long, and assigned to the assignee of the present invention. The governor valve 142 is effective to distribute the highest output governor pressure in passage 136 and 138 to the passage 146 and the lower of the two pressures to passage to trim passage 148.

Figure 2C:
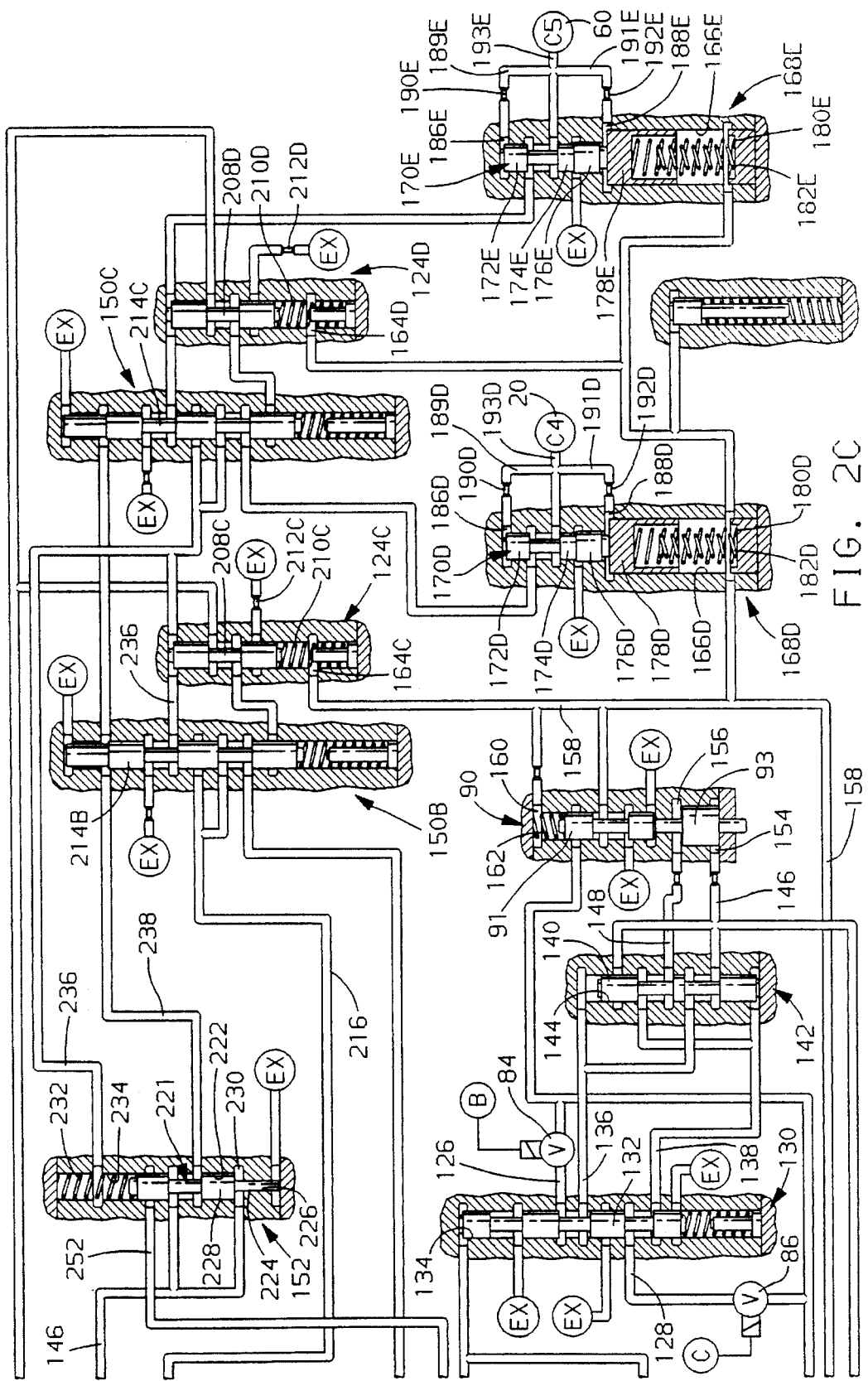

Generally, when the controls are functioning as desired, the pressure in passage 136 will always be higher than or equal to the pressure in passage 138, such that the fluid connection shown in FIG. 2C will be attained. The pressure in passage 146 is connected with the reverse inhibit valve 104, the 1–2 shift valve 114, a 2–3 shift valve 150 and a third ratio latch valve 152. The passage 146 is also connected to a control chamber 154 on the trim pressure control valve element 93.

The pressure in passage 148 is connected to a control chamber 156 on the trim pressure control valve 93. The area of control chamber 154 is equal to the area of control chamber 156 such that the output pressure in trim passage 158 will be responsive to the difference in pressures in the respective passages 146 and 148 times the differential area between 91 and 93.

When the transmission is commanded to change ratios, the governor pressure in passage 146 is boosted by the solenoid valve 84 such that the pressure in chamber 154 will be higher than or equal to the pressure in chamber 156. During the governor pressure change, the pressure in passage 148 is set by solenoid valve 86 to a level to establish the desired trim pressure in passage 158. The pressure in passage 158 is operable in a control chamber 160 formed at one end of the valve 91 to control the distribution of pressure from the main passage 78 to the trim passage 158. As the pressure in trim passage 158 increases, the pressure in chamber 160 and a control spring 162 will be effective to balance the pressure in the chamber 154 and thereby establish a new trim pressure to be utilized during the shift sequence.

When the ratio interchange has been completed, the pressure output of solenoid valve 86 will be increased thereby increasing the pressure in passage 148 which will be effective in the chamber 156 to assist in reducing the pressure in trim passage 158. The trim passage 158 is in fluid communication with a trim chamber 164 on the trip valves 124. The pressure in passage 158 is also in fluid communication with a trim boost chamber 166 formed in a plurality of trim valves 168. The trim valve 168B is effective to control the engagement pressure in the second ratio clutch 38 during the ratio interchange. The trim valves 168A, 168C, 168D and 168E, control the trim pressure or clutch control engagement pressure in the clutches 58, 40, 20 and 60, respectively.

When the manual valve is moved to the forward position and the synchronizer 42 has been positioned to the forward position, the forward clutch feed passage 70 will distribute pressure via the 1–2 shift valve 114 to the trim valve 168A. The trim valve 168A includes a valve spool 170A, which has three lands 172A and 174A which are of equal diameter, and 176A which is of a larger diameter. The valve land 176A is disposed adjacent a trim plug 178A which is subject to the pressure in a trim chamber 188A and is operated on by a pair of springs 180A and 182A.

When the manual valve is moved to the forward position, the 1–2 shift valve 114 distributes pressure via a passage 184 to the trim valve 168A which admits pressure to the clutch 58 between the lands 172A and 174A. The fluid pressure distributed to the clutch 58 is also received in a feedback chamber 186A and the trim chamber 188A through passages 189A, 191A and restrictions 190A and 192A, respectively. The pressure in trim chamber 188A is effective on the diameter of land 176A, while the pressure in chamber in 186A is effective on the relatively smaller diameter of land 172A.

The restriction 190A preferably permits more rapid fluid flow to the chamber 186A than does the restriction 192A permit flow to the chamber 188A. Thus, the fluid pressure in chamber 186A will develop more rapidly tending to move the valve spool 170 downward thereby closing off the passage 184 to control the pressure rise in passage 193A and in the clutch 58. The pressure in chamber 188A will cause stroking of the plug 178A against the spring 180A initially, and as the plug progresses downward in the chamber 166A, the spring 182A will be contacted as the chamber 188A expands.

As the pressure increases in the chamber 188A, the valve spool 170A will move upward, due to the differential area, thereby admitting more pressure to the clutch 58 which will result in increased pressures in the chambers 186A and 188A. This pressure rise control will continue until the clutch 58 is fully engaged. It should be noted that the pressure rise within the chamber 188A is affected by the trim boost pressure in chamber 166A and the rate of the springs 180A and 182A. When the trim pressure in passage 158 is elevated, the initial pressurization of clutch 58 will be rapid and then the rate of springs 180A and 182A will control the rate of pressure rise. Thus, if the operator is providing a heavy throttle for requiring significant torques, the clutch will receive an initial rapid engagement or takeup of the piston, such that there will be minimum slippage during the engagement of the clutch 58.

When the control 72 senses that a 1–2 upshift is desired, the pressure in the governor passage 146 will be increased such that a shift chamber or control chamber 194 will be pressurized sufficiently to permit a 1–2 valve spool 196 to overcome force in a spring 198 resulting in the valve spool being shifted to the second ratio position. In the second ratio position, the valve spool 196 is effective to distribute clutch feed pressure in passage 70 to a second clutch feed passage 200 and to connect a clutch release passage 202 to the passage 184.

The passage 200 is connected to the 2–3 shift valve 150A which, in the second ratio position, is effective to distribute the pressure from passage 200 to a second clutch apply passage 206. The fluid pressure in passage 206 is distributed to passage 193B via the second trim valve 168B to control the engagement of the clutch 38.

Simultaneous with the establishment of fluid pressure in the clutch 38, fluid pressure in the clutch hold passage 122 will be distributed via the first trip valve 124A to the passage 184 which will reduce the pressure in the clutch 58 to a value equal to the pressure in the passage 122. This pressure will prevent the complete disengagement of the clutch 58 pending initial engagement of the clutch 38.

However, as the pressure in passage 200 is increased, a force on a spool valve 208A of the first trip valve 124A will be urged downward against a spring 210A. This downward force is counterbalanced also by fluid pressure in the trim passage 158. Thus, the higher the torque level desired or commanded by the operator, the longer the delay will be in moving the trip valve 124A. Until the trip valve 124A is shifted such that the valve spool 208A will discontinue fluid connection between passages 122 and 202, the pressure in the clutch 58 will remain at the hold pressure level. When the valve spool 208A moves downward, the passage 202 will be connected to exhaust and the passage 122 will be blocked permitting the clutch 58 to be exhausted through a restriction 212A. The trim valve 168B will function to control the pressure rise in the clutch 38 in a manner similar to that described above for the pressure rise control in clutch 58.

As the control 72 continues to sense the vehicle speed and throttle position, a shift command to the 2–3 shift valve 150A will be issued resulting in the governor pressure being increased sufficiently in passage 146 to cause a spool valve 214A to be shifted to the third ratio position such that fluid pressure in passage 200 will be communicated to a third clutch feed passage 216 and the passage 206 will be communicated with a clutch disengage passage 218 through the trip valve 124B. The trip valve 124B will control the reduced pressure in clutch 38 in a manner described above for the clutch 58 while the pressure in passage 216 will be directed through a 3–4 shift valve 150B and a shuttle valve 220 to the third trim valve 168C which will, in the manner described previously for clutches 38 and 58, control a pressure rise in the third clutch 40.

The trim valve 168C will control the pressure rise in clutch 40 while the trip valve 124B controls the disengagement pressure of the clutch 38, such that the ratio interchange between second and third ratio will proceed in an orderly manner.

The governor passage 146 is in fluid communication with the third latch valve 152. The third latch valve 152 includes a valve spool 221 which is slidably disposed in a bore 222. The valve spool 221 has an end 224 slidably disposed in a bore 226 such that a differential area between a lower land 228 and the end 224 is established. These areas cooperate to provide a differential area or control chamber 230.

The valve spool 221 is urged, as shown in FIG. 2C, by a spring 232 toward the chamber 230. The spring 232 is disposed in a spring chamber 234 which is in fluid communication with a fourth clutch passage 236. When this passage is pressurized during fourth clutch engagement, the third latch valve 152 will be maintained in the position shown. In this position, the pressure in governor passage 146 is distributed to a 4–5 governor passage 238 which is distributed to the 3–4 shift valve 150B and a 4–5 shift valve 150C.

If the pressure in governor passage 146, prior to fluid pressure becoming available in passage 236, is sufficient in the chamber 230 to overcome the force in spring 232, the valve spool 221 will be shifted to a pressure position which will disconnect the 4–5 governor passage 238 from the governor passage 146 thereby preventing a shift signal from reaching shift valves 150B and 150C. However, the signal in governor passage 146 will not be sufficiently high to overcome the spring, under normal operating conditions, prior to the fourth clutch being engaged. This signal will be sufficiently high if the electrical signal to solenoids 84 and 86 is discontinued. When this occurs prior to a 3–4 upshift, the output pressure of the valve 130 will be equal to main pressure, such that the governor pressure in the chamber 230 will immediately shift the third latch valve 152 to the pressure set position, thereby preventing the 3–4 and 4–5 shift valves from assuming their upshifted position.

During normal operation, however, the fluid pressure in passage 238 will be elevated when a 3–4 upshift is required by the control 72, resulting in the trim valve 168D being operative to control the pressure in the fourth ratio clutch 20 and the trip valve 124C being effective to control the pressure decay in the clutch 40.

It should be noted that when the 3–4 shift valve 150B assumes the upshifted or fourth ratio position, the passage 236 is pressurized thus providing a bias signal in the spring chamber 234 which will prevent the third latch valve 152 from being shifted from the spring set position. This passage 236 remains pressurized whenever fourth or fifth ratio is established.

Continued pressure rise in the governor passage 146 and therefore governor passage 238 will occur when the control 72 establishes that a 4–5 upshift is required. When a 4–5 upshift is required, the valves 150C will assume the upshifted position, such that the trip valve 124D will control the disengagement of clutch 20 while the trim valve 168E controls the engagement pressure rise in the clutch 60.

During a downshifting sequence, for example, from 5 to 4, the off-going clutch 60 will be immediately exhausted through the shift valve 150C and an orifice while the on-coming clutch 20 will have the pressure engagement cycle controlled by the trim valve 168D. These same sequences will occur on a 4–3 downshift, a 3–2 downshift and a 2–1 downshift. The respective valves will control the engagement of the on-coming clutch while the off-going clutch is released or disengaged through the respective shift valve and orifice.

It should also be noted that the governor passage 146 is connected to a control chamber 240 on the reverse inhibit valve 104. When the governor pressure in passage 146 attains a predetermined level, a spool 242 of the valve 104 will be moved to a pressure set position against the force in a spring 244. In this position, the reverse passage 96 is blocked by a land 246 and the passage 112 is exhausted between the land 246 and a land 248. This will effectively prevent an inadvertent reversing engagement as long as the governor pressure is above this predetermined value.

The spring 244 of the reverse inhibit valve 104 is disposed in a spring chamber 250 which is in fluid communication with a governor passage 252 which is connected with the third latch valve 152. As seen in FIG. 2C, when the valve spool 221 is moved upward against the spring 232, fluid pressure in the governor passage 146 is directed between the lands of valve spool 221 to the passage 252. Thus, during a discontinuance of the electrical signal to the solenoid valves 84 and 86, the passage 252 will be subjected to main line pressure as will the chamber 250. High fluid pressure in the chamber 250, along with the spring 244, will force the reverse inhibit valve 104 to assume the position shown in FIG. 2B. This will permit the selection of a reverse drive by the manual valve whenever an electrical discontinuance has occurred.

During an electrical discontinuance, the operator, if operating in fourth or fifth gear, will maintain that gear operation. In fact, the system will remain in fifth gear until the vehicle is brought to a halt. During this slowing of the vehicle, the operator will recognize that there is an inappropriate function occurring and will recognize that there is some need for repair.

Upon bring the vehicle to a halt and shifting the manual valve to neutral, the pressure to the various clutches is discontinued, such that all the clutches will disengaged. At this point, the governor output pressure in passage 146 will be at a maximum thereby triggering third latch valve 152 to the pressure set position and the reverse inhibit valve to the spring set position. Should the operator select a forward drive position at the manual selector valve, the system will immediately condition the transmission for operation in the third gear by engaging the clutch 40, while the clutches 38 and 58 are exhausted through their respective trip valves.

The governor pressure in passage 238 is not pressurized and therefore the valves 150B and 150C cannot be upshifted, thus the third gear forward is the only possible ratio available. Should the operator shift to reverse, the reverse inhibit valve will be held in the spring set or reverse position which will result in fluid pressure in passage 112 being operable to control the shift fork control 62 resulting in pressure setting of the valve 106 and pressurization of the passage 68. Pressurization of the feed passage 68 will operate on the valve 130 thereby exhausting the governor pressure and simultaneously moving the shuttle valve 220 to the reverse position, such that the pressure in passage 68 is directed to the clutch 40. The engagement of the clutch 40 will be controlled by the trim valve 168C to establish the reverse drive within the transmission.

Shifting from reverse to forward drive will result in the reverse circuit being exhausted through passage 96 at the manual valve 88 and simultaneously pressurizing the forward passage 94 which will energize the control 62 to engage the synchronizer in the forward position and provide the pressurization of the passage 70 which, as previously described, will result in energization of the clutch 40 and the establishment of the third forward ratio.

From the foregoing description, it should be obvious that the control will permit the establishment of one forward ratio and one reverse ratio upon the discontinuance of the electrical control system.

The embodiments of the invention in which an exclusive property or privilege is claimed are defined as follows:

1. In combination, a multi-speed transmissions and control comprising:

fluid operated friction means for providing at least four forward speed ratios and a reverse speed ratio;

governor means for normally providing governor pressure proportional to vehicle speed;

shift valve means for controlling the establishment of the second through fourth forward speed ratios sequentially in accordance with the governor pressure from the governor means;

selector valve means for selecting a forward drive, a reverse drive and a neutral condition;

inhibitor valve means for normally preventing the establishment of the reverse speed ratio if the governor pressure provided by the governor means is above a predetermined level; and valve means responsive to governor pressure for preventing the inhibitor valve means from operating and for preventing the shift valve means from establishing the fourth forward speed ratio when the selector valve is in neutral and the governor pressure is elevated.

2. In combination, a multi-speed transmissions and control comprising:

fluid operated friction means for providing at least four forward speed ratios and a reverse speed ratio;

governor means for normally providing governor pressure proportional to vehicle speed;

shift valve means for controlling the establishment of the second through fourth forward speed ratios sequentially in accordance with the governor pressure from the governor means;

selector valve means for selecting a forward drive, a reverse drive and a neutral condition;

inhibitor valve means continuously communicating with said governor means for normally preventing the establishment of the reverse speed ratio if the governor pressure provided by the governor means is above a predetermined level: and valve means responsive to governor pressure for directing a signal to said inhibitor valve means for preventing the inhibit valve means from operating and for preventing the shift valve means from establishing the fourth forward speed ratio when the selector valve is in neutral and the governor pressure is elevated.

* * * * *